(12) United States Patent
Boyapati et al.

(10) Patent No.: US 7,571,608 B2
(45) Date of Patent: Aug. 11, 2009

(54) TURBOCHARGED ENGINE SYSTEM AND METHOD OF OPERATION

(75) Inventors: Chenna Krishna Rao Boyapati, Bangalore (IN); Krishnamurthy Vaidyanathan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/287,674

(22) Filed: Nov. 28, 2005

(65) Prior Publication Data

US 2007/0119171 A1    May 31, 2007

(51) Int. Cl.
*F02B 33/44*    (2006.01)
*F02B 33/00*    (2006.01)
*F02B 37/00*    (2006.01)
*F02M 25/07*    (2006.01)

(52) U.S. Cl. .................. 60/612; 60/605.2; 123/562; 123/568.18

(58) Field of Classification Search .............. 60/602, 60/605.2, 611, 612, 607–609; 123/562, 568.18, 123/568.21, 568.12, 568.14; F02B 37/00; F02M 25/07
See application file for complete search history.

(56) References Cited

U.S. PATENT DOCUMENTS

| | | | | |
|---|---|---|---|---|
| 4,231,225 A | * | 11/1980 | Aya ............................... | 60/612 |
| 4,291,535 A | * | 9/1981 | Goloff .......................... | 60/602 |
| 4,505,169 A | * | 3/1985 | Ganoung ....................... | 477/100 |
| 5,105,624 A | * | 4/1992 | Kawamura .................... | 60/612 |
| 5,226,401 A | * | 7/1993 | Clarke et al. ............. | 123/568.14 |
| 5,564,275 A | | 10/1996 | Codan et al. ................ | 60/605.2 |
| 5,611,202 A | * | 3/1997 | Sumser et al. .............. | 60/605.2 |
| 5,791,146 A | * | 8/1998 | Dungner ....................... | 60/605.2 |
| 5,791,319 A | * | 8/1998 | Friedrich et al. ......... | 123/568.18 |
| 5,794,445 A | * | 8/1998 | Dungner ....................... | 60/605.2 |
| 6,089,019 A | | 7/2000 | Roby et al. ................. | 60/605.2 |
| 6,112,729 A | * | 9/2000 | Barnes et al. .............. | 123/568.21 |
| 6,138,649 A | | 10/2000 | Khair et al. ................ | 123/568.12 |
| 6,230,696 B1 | | 5/2001 | Veit et al. .................. | 123/568.12 |
| 6,237,335 B1 | | 5/2001 | Loennqvist ................. | 60/605.2 |
| 6,263,672 B1 | | 7/2001 | Roby et al. ................. | 60/605.2 |

(Continued)

FOREIGN PATENT DOCUMENTS

EP    620365 A1 * 10/1994

(Continued)

*Primary Examiner*—Thai Ba Trieu
(74) *Attorney, Agent, or Firm*—Patrick K. Patnode

(57) ABSTRACT

A system is provided. The system includes an internal combustion engine having an intake manifold and an exhaust manifold. The system also includes a high pressure turbocharger having a variable geometry high pressure turbine drivingly coupled to a high pressure compressor, wherein the variable geometry high pressure turbine is driven by a first portion of exhaust gases from the exhaust manifold, wherein the high pressure compressor is configured to compress an intake air and to provide the compressed intake air to the intake manifold. The system also includes a low pressure turbocharger having a variable geometry low pressure turbine drivingly coupled to a low pressure compressor, wherein the variable geometry low pressure turbine is driven by a second portion of the exhaust gases from the exhaust manifold, wherein the low pressure compressor is configured to compress a third portion of the exhaust gases from the exhaust manifold and to provide the compressed third portion to the intake manifold, wherein the first and second portions of the exhaust gases are different from one another.

27 Claims, 8 Drawing Sheets

U.S. PATENT DOCUMENTS

| | | | |
|---|---|---|---|
| 6,263,673 B1 * | 7/2001 | Schmidt et al. | 60/612 |
| 6,301,889 B1 * | 10/2001 | Gladden et al. | 60/605.2 |
| 6,308,517 B1 | 10/2001 | Fausten et al. | 60/605.2 |
| 6,412,278 B1 | 7/2002 | Matthews | 60/605.1 |
| 6,435,166 B1 * | 8/2002 | Sato et al. | 123/568.12 |
| 6,470,866 B2 | 10/2002 | Cook | 123/568.27 |
| 6,651,432 B1 | 11/2003 | Gray, Jr. | 60/605.2 |
| 6,868,824 B2 | 3/2005 | Yang et al. | 123/321 |
| 6,871,642 B1 | 3/2005 | Osterwald | 123/568.11 |
| 6,886,544 B1 * | 5/2005 | Bui | 123/568.18 |
| 6,928,360 B2 * | 8/2005 | Baeuerle et al. | 701/102 |
| 6,945,240 B2 * | 9/2005 | Kobayashi et al. | 123/568.21 |
| 6,981,375 B2 * | 1/2006 | Sisken et al. | 60/612 |
| 7,222,615 B2 * | 5/2007 | Buck et al. | 60/605.2 |
| 7,260,933 B2 * | 8/2007 | Barba et al. | 60/605.1 |
| 2001/0029935 A1 | 10/2001 | Cook | 123/568.27 |
| 2005/0056017 A1 | 3/2005 | Sisken et al. | 60/605.2 |
| 2005/0056263 A1 * | 3/2005 | Kennedy | 123/568.12 |
| 2005/0103013 A1 * | 5/2005 | Brookshire et al. | 60/605.2 |
| 2006/0021347 A1 * | 2/2006 | Sun et al. | 60/612 |
| 2007/0240691 A1 * | 10/2007 | Geyer et al. | 123/568.21 |

FOREIGN PATENT DOCUMENTS

| | | |
|---|---|---|
| EP | 0740065 | 10/1996 |
| EP | 992663 A2 * | 4/2000 |
| EP | 1178192 A2 * | 2/2002 |
| EP | 1186767 A2 * | 3/2002 |
| JP | 05071426 A * | 3/1993 |
| JP | 06002553 A * | 1/1994 |
| JP | 2000008963 A * | 1/2000 |
| JP | 2004100508 A * | 4/2004 |
| JP | 2005098124 A * | 4/2005 |
| JP | 2005147030 A * | 6/2005 |
| WO | WO2005098220 | 10/2005 |

* cited by examiner

TURBOCHARGED ENGINE SYSTEM AND METHOD OF OPERATION

BACKGROUND

The invention relates generally to engine systems and more particularly to a technique for reducing pollutant emissions, e.g., Nitrogen Oxide ($NO_x$) emissions, in turbocharged internal combustion engines.

Various types of internal combustion engines are in use for powering vehicles such as locomotives, passenger cars and other equipment. An internal combustion engine may include one or more turbochargers for compressing an intake charge (e.g., atmospheric air), which is supplied to one or more combustion chambers within the engine. Each turbocharger includes a turbine driven by exhaust gases from the engine and a compressor driven by the turbine. Moreover, the compressor receives the atmospheric air to be compressed and provides the compressed air to the combustion chambers.

Typically, a turbocharged internal combustion engine is operated such that the intake manifold pressure is higher than the exhaust manifold pressure in the engine. In certain traditional systems, exhaust gas recirculation (EGR) is employed for reducing undesirable $NO_x$ emissions in operation of the engines. Unfortunately, it is difficult to control the exhaust gas recirculation of the exhaust gases while substantially overcoming the pressure difference between the intake and exhaust manifolds. Further, such techniques substantially impact the specific fuel consumption (SFC) and particulate matter (PM) emissions and do not provide efficient control of the exhaust gas circulation for the entire range of throttle notch settings applied to the duty cycle for locomotive operation and at high altitudes.

Accordingly, a need exists for providing a turbocharged engine system that has substantially reduced $NO_x$ emissions for different engine operating conditions while achieving a desired specific fuel consumption (SFC) for the engine.

BRIEF DESCRIPTION

In accordance with certain embodiments, the present technique has a system. The system includes an internal combustion engine having an intake manifold and an exhaust manifold. The system also includes a high pressure turbocharger having a variable geometry high pressure turbine drivingly coupled to a high pressure compressor, wherein the variable geometry high pressure turbine is driven by a first portion of exhaust gases from the exhaust manifold, wherein the high pressure compressor is configured to compress an intake air and to provide the compressed intake air to the intake manifold. The system also includes a low pressure turbocharger having a variable geometry low pressure turbine drivingly coupled to a low pressure compressor, wherein the variable geometry low pressure turbine is driven by a second portion of the exhaust gases from the exhaust manifold, wherein the low pressure compressor is configured to compress a third portion of the exhaust gases from the exhaust manifold and to provide the compressed third portion to the intake manifold, wherein the first and second portions of the exhaust gases are different from one another.

In accordance with certain embodiments, the present technique has a method of operating an engine system. The method includes routing a first portion of exhaust gases from an internal combustion engine to drive a variable geometry high pressure turbine of a high pressure turbocharger and routing a second portion of the exhaust gases to drive a variable geometry low pressure turbine of a low pressure turbocharger. The method also includes routing a third portion of the exhaust gases to a low pressure compressor of the low pressure turbocharger to compress the third portion of exhaust gases for intake into the internal combustion engine, wherein the first and second portions of exhaust gases are different from one another.

In accordance with certain embodiments, the present technique has a method for reducing pollutant emissions in an internal combustion engine. The method includes coupling a high pressure turbocharger having a high pressure compressor and a variable geometry high pressure turbine to the internal combustion engine. The method also includes coupling a low pressure turbocharger having a low pressure compressor and a variable geometry low pressure turbine in a generally parallel flow configuration with the high pressure turbocharger, wherein the generally parallel flow configuration includes a first portion of exhaust gases from the internal combustion engine to the variable geometry high pressure turbine, and a second portion of the exhaust gases from the internal combustion engine to the variable geometry low pressure turbine.

DRAWINGS

These and other features, aspects, and advantages of the present invention will become better understood when the following detailed description is read with reference to the accompanying drawings in which like characters represent like parts throughout the drawings, wherein.

Figure 5:
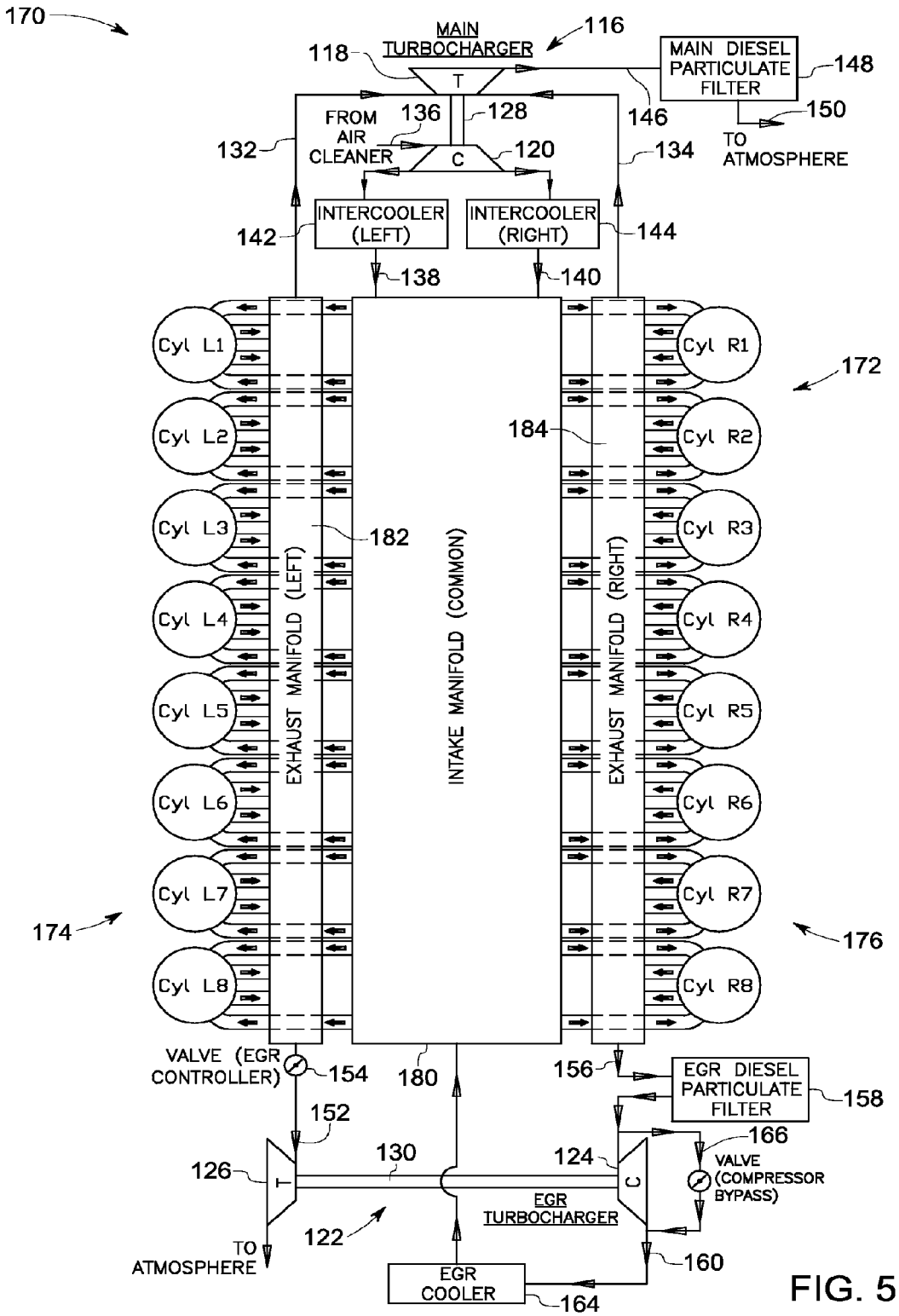
FIG. 5 is a diagrammatical illustration of a turbocharged internal combustion engine system having an exemplary exhaust gas recirculation mechanism for an engine with engine left and right banks with a common intake manifold in accordance with embodiments of the present technique.
Figure 6:
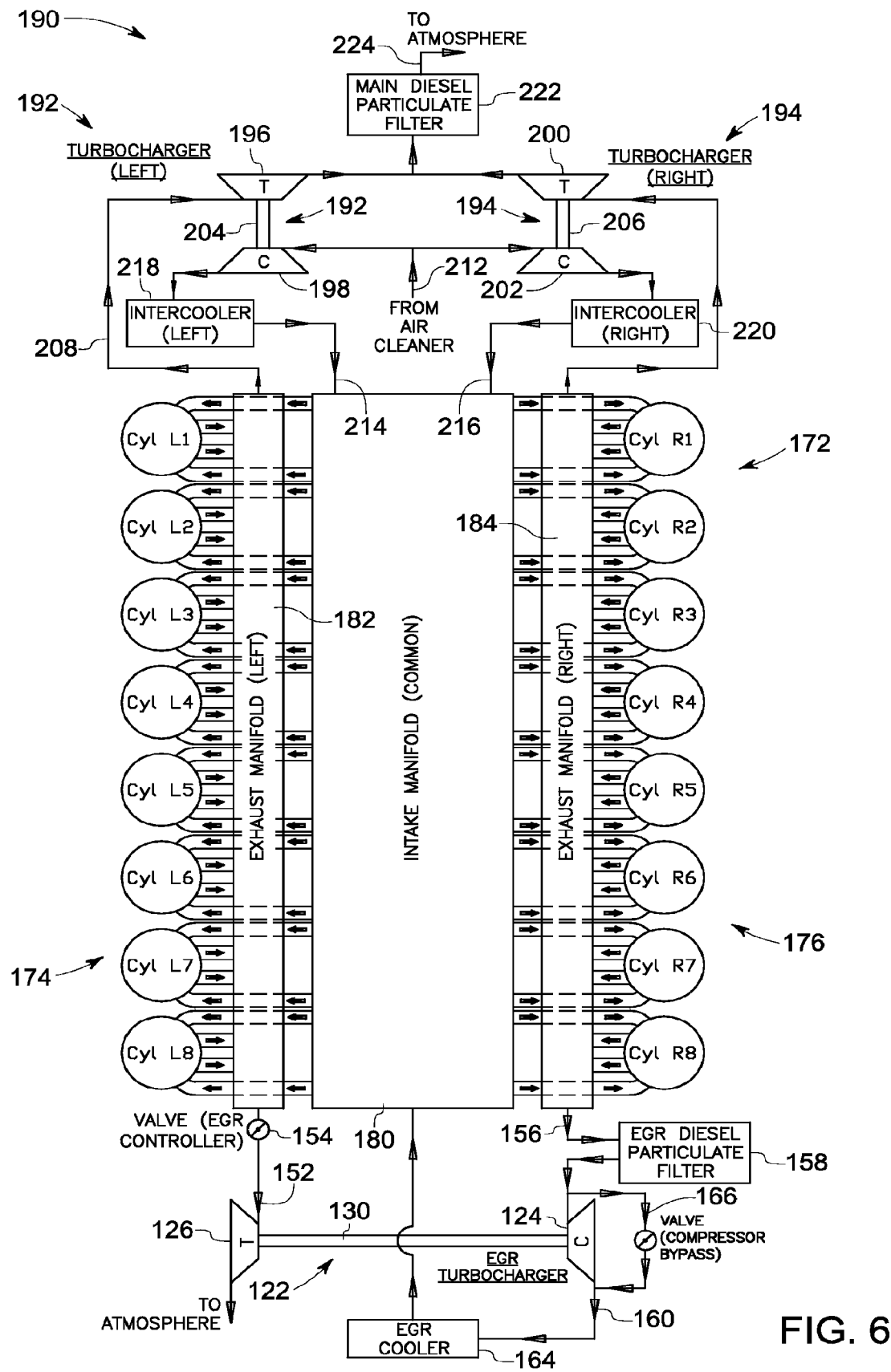
FIG. 6 is a diagrammatical illustration of a turbocharged internal combustion engine system having an exemplary exhaust gas recirculation mechanism for the engine with separate turbochargers coupled to the engine left and right banks in accordance with embodiments of the present technique.
Figure 7:
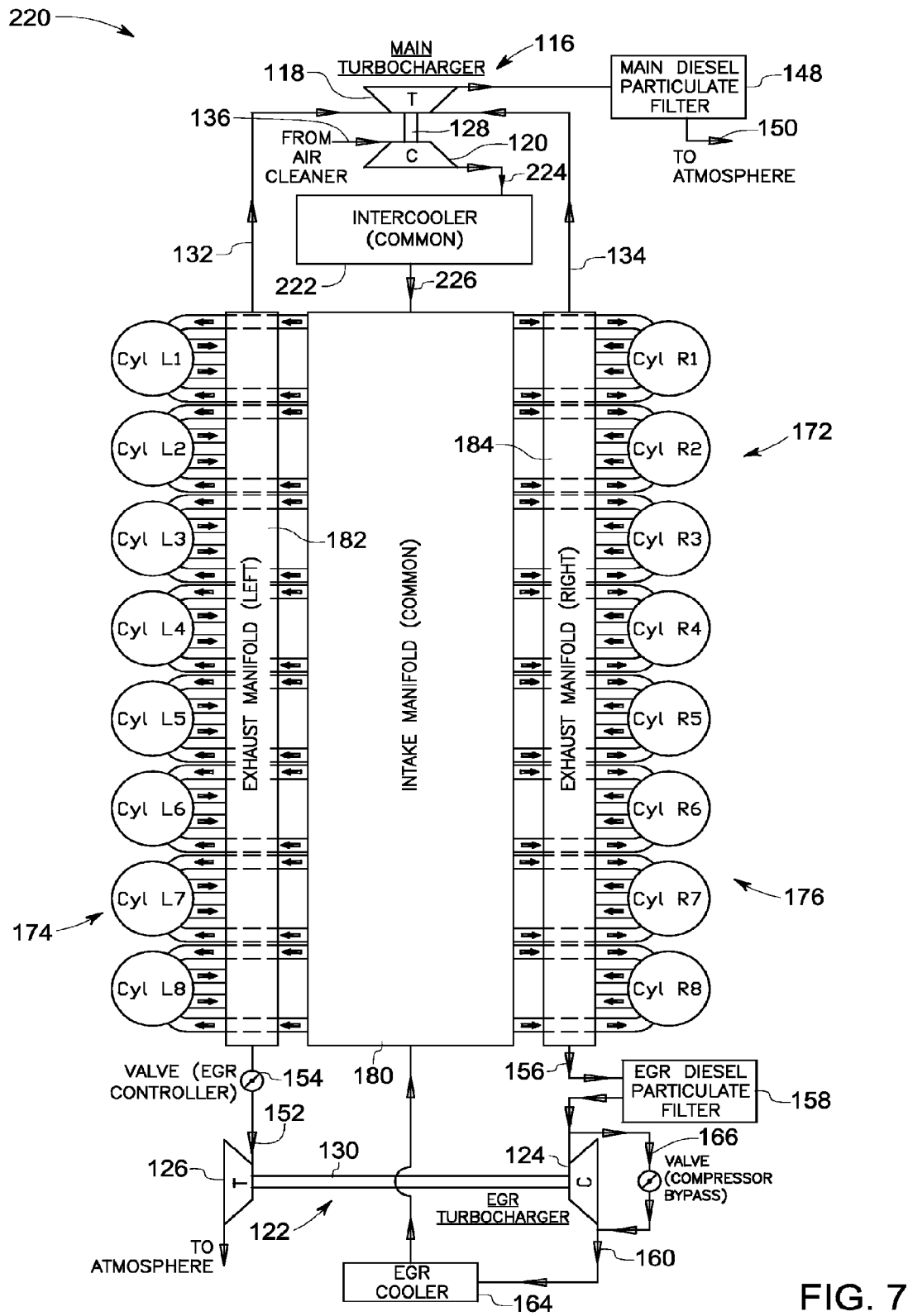
Figure 8:
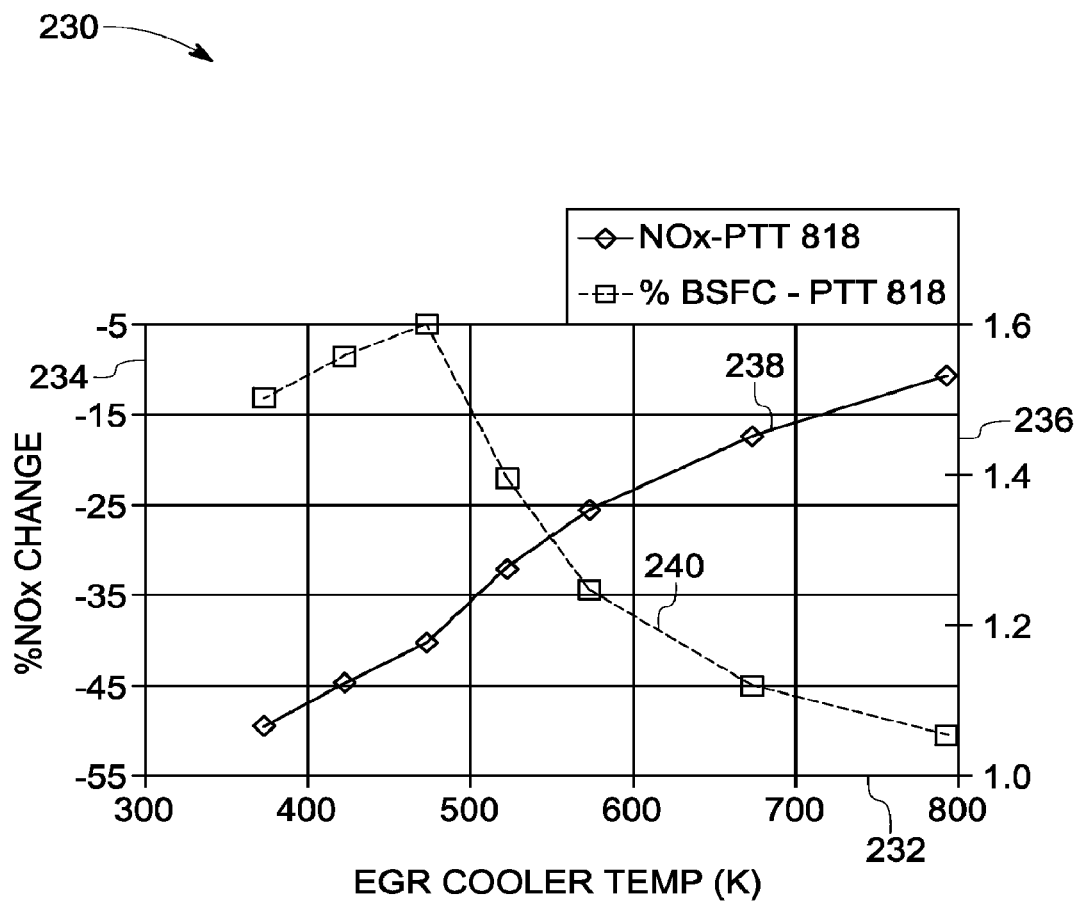

FIG. 7 is a diagrammatical illustration of another turbocharged internal combustion engine system having an exemplary exhaust gas recirculation mechanism for the engine with a common intercooler for engine left and right banks in accordance with embodiments of the present technique; and FIG. 8 is a graphical representation 230 of $NO_x$ emissions and the brake specific fuel consumption (BSFC) at different EGR cooler temperatures for the turbocharged internal combustion engines of FIGS. 1-7 in accordance with embodiments of the present technique.

DETAILED DESCRIPTION

As discussed in detail below, embodiments of the present technique function to reduce emissions in turbocharged internal combustion engine systems such as employed in locomotives and vehicles. For example, the internal combustion engines may include spark ignition engines or compression-ignition engines, such as diesel engines. In particular, the present technique includes employing selective exhaust gas recirculation with the intake air within the turbocharged internal combustion engine system to minimize emissions, such as $NO_x$ emissions, from the system. In particular, the mixing of the exhaust gases with the intake air lowers the peak combustion temperature and the adiabatic flame temperature, thereby reducing the emissions from the system.

Figure 1:
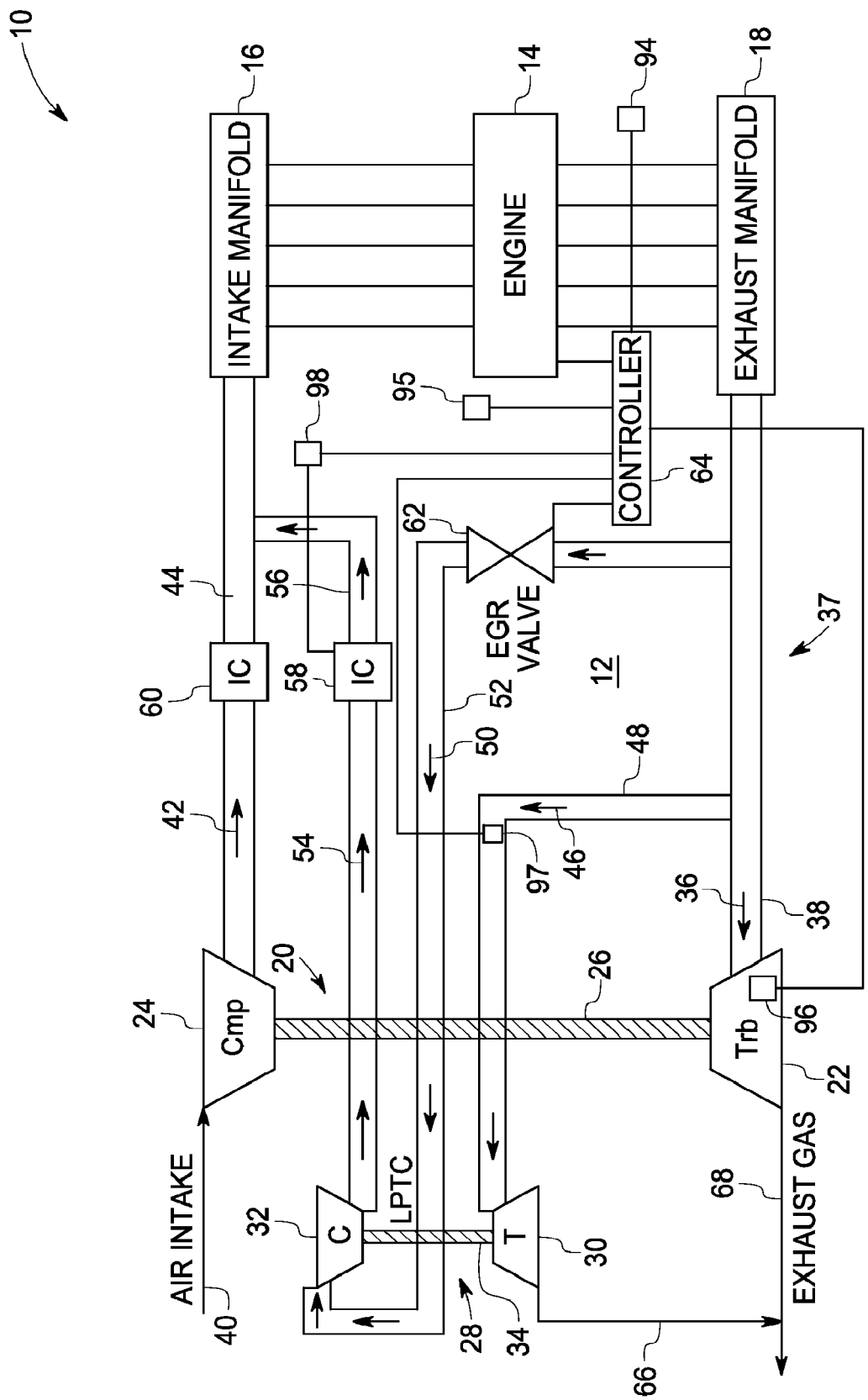
FIG. 1 is a diagrammatical illustration of a turbocharged internal combustion engine system with exhaust gas recirculation in accordance with embodiments of the present technique.

Turning now to the drawings and referring first to FIG. 1, a turbocharged internal combustion engine system 10 having an exemplary exhaust gas recirculation mechanism 12 is illustrated. Examples of the turbocharged internal engine system 10 include a vehicle (e.g., a locomotive, an automobile, an aircraft, a watercraft (marine), heavy construction equipment/vehicles, etc.), a power generation system, an industrial or commercial automation system, pumps and so forth. In the illustrated embodiment, the system 10 includes an internal combustion engine 14 having an intake manifold 16 and an exhaust manifold 18. In this embodiment, the intake manifold pressure is substantially greater than the exhaust manifold pressure. In certain embodiments, the internal combustion engine 14 includes a compression ignition engine such as a diesel engine. Further, the system 10 includes a high pressure turbocharger 20 having a variable geometry high pressure turbine 22 that is drivingly coupled to a high pressure compressor 24 via a shaft 26. In addition, the system 10 also includes a low pressure turbocharger 28 having a variable geometry low pressure turbine 30 drivingly coupled to a low pressure compressor 32 via a shaft 34. In this embodiment, the low pressure turbocharger 28 is coupled in a generally parallel configuration with the high pressure turbocharger 20. In other words, exhaust flowing from the exhaust manifold 18 is split into parallel or simultaneous flows to the turbines 22 and 30, rather than flowing through one turbine after another. Further, the variable geometry high pressure and low pressure turbines 22 and 30 facilitate reduction of emissions for an entire range of throttle notch settings applied to the system 10 and particularly for operation at high altitudes.

In operation, the variable geometry high pressure turbine 22 is driven by a first portion 36 of exhaust gases from the exhaust manifold 18 which is routed to the high pressure turbine 22 via a conduit 37 that splits into a conduit 38 and other conduits as discussed below. Further, the high pressure compressor 24 is driven by the high pressure turbine 22 through the shaft 26 and is configured to compress an intake air 40. The compressed air 42 from the high pressure compressor 24 is then directed to the intake manifold 16 via a conduit 44.

Similarly, the variable geometry low pressure turbine 30 is driven by a second portion 46 of the exhaust gases from the exhaust manifold 18. In this embodiment, the second portion 46 of the exhaust gases is routed to the low pressure turbine 32 via a conduit 48 that splits off of the conduit 37. Again, the low pressure compressor 32 is driven by the low pressure turbine 30 via the shaft 34 and is configured to compress a third portion 50 of the exhaust gases from the exhaust manifold 18. The third portion 50 of the exhaust gases from the exhaust manifold 18 is routed to the low pressure compressor 32 via a conduit 52 that splits off of the conduit 37. The compressed third portion 54 is provided to the intake manifold 16 via a conduit 56. In this embodiment, the first and second portions 36 and 46 are different from one another. Moreover, the third portion 50 is different from the first and second portions 36 and 46. In other words, the first, second, and third portions 36, 46, and 50 are simultaneous or parallel flows that are respective fractions of the entire exhaust flow exiting from the exhaust manifold 18 through conduit 37. It should be noted that the respective fractions for the first, second and third portions may depend upon the type of application. In one embodiment, the % exhaust gas recirculation (EGR) is about 12

The system 10 also includes an intercooler (IC) or cooler 58 disposed downstream of the low pressure compressor 32 and configured to cool the third portion 54 of exhaust gases prior to introduction into the intake manifold 16. Additionally, an intercooler (IC) or cooler 60 is disposed downstream of the high pressure compressor 24 and is configured to cool the compressed intake air 42 from the high pressure compressor 24. In this embodiment, the coolers 58 and 60 facilitate reduction in emissions and relatively less hit on the specific fuel consumption (SFC) of the system. Further, the system 10 also includes an exhaust gas recirculation (EGR) valve 62 to control a flow of the third portion 54 of the exhaust gases to the low pressure compressor 22. A controller 64 is coupled to the EGR valve 62 for controlling the flow via the EGR valve 62 based upon engine operating conditions such as a notch setting, an altitude 94, an ambient temperature 95 and other factors such as high pressure turbine nozzle ring area 96, flow rate 97 through the low pressure turbine 30 and EGR cooler temperature,98 or performance of the low pressure turbocharger 28, or performance of the high pressure turbocharger 20 and so forth. Advantageously, the recirculation of the exhaust gases as described above substantially reduces the pollutant emissions from the system 10. In certain embodiments, a portion of exhaust gases 66 and 68 from the low pressure and high pressure turbines 30 and 22 may be recirculated within the system 10 to reduce the emissions as will be described below with reference to FIG. 2. In certain other embodiments, a particulate filter (not shown) may be employed to filter any particulate matter from the exhaust gases 66 and 68.

Figure 2:
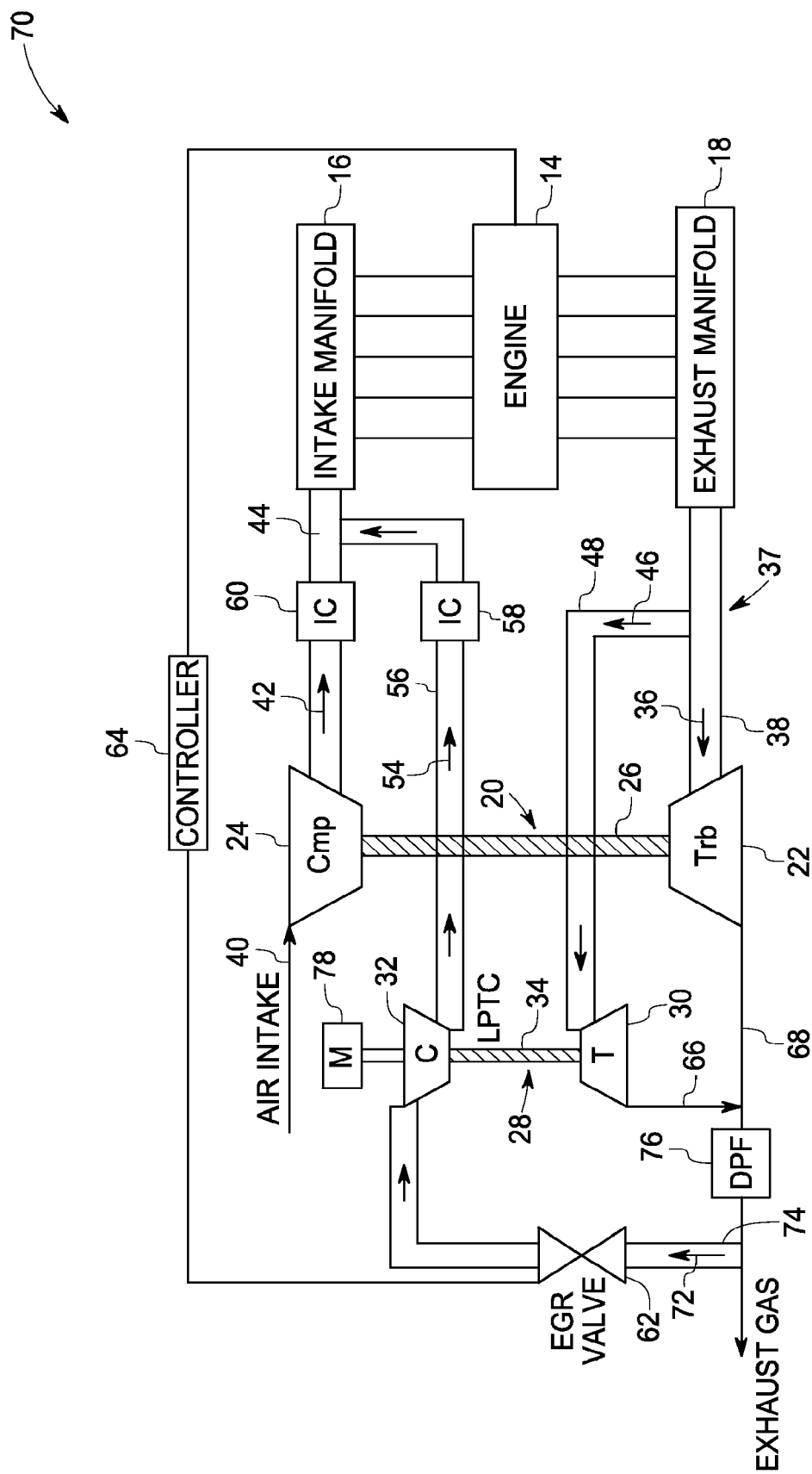
FIG. 2 is a diagrammatical illustration of a turbocharged internal combustion engine system having another exemplary exhaust gas recirculation mechanism for reducing the pollutant emissions from the system in accordance with embodiments of the present technique.

FIG. 2 is a diagrammatical illustration of a turbocharged internal combustion engine system 70 having another exemplary exhaust gas recirculation mechanism for reducing the pollutant emissions from the system 70. In this embodiment, a portion 72 of exhaust gases from the low pressure turbine 30 and the high pressure turbine 22 is routed to the low pressure compressor 32 via a conduit 74 and is compressed via the low pressure compressor 32. Further, the compressed gases 54 are directed to the intake manifold 16. Again, the EGR valve 62 may be employed to control the flow of exhaust gases 72 to the low pressure compressor 32. In contrast to the embodiment of FIG. 1, the exhaust gases 72 are obtained downstream rather than upstream of the turbines 22 and 30. In other words, the flow of exhaust gases 72 are in series rather than in parallel with the flows of exhaust gases 36 and 46. Furthermore, the controller 64 is coupled to the EGR valve 62 for controlling the flow through the EGR valve 62 based upon engine operating conditions. In the illustrated embodiment, the system 70 also includes a particulate filter 76 that is configured to filter particulate matter from the exhaust gases 66 and 68 from the low pressure and high pressure turbine 30 and 32. Further, in certain embodiments, the system 70 includes a motor 78 that is configured to drive the low pressure turbocharger 30 at selected operating conditions of the internal combustion engine 14.

Figure 3:
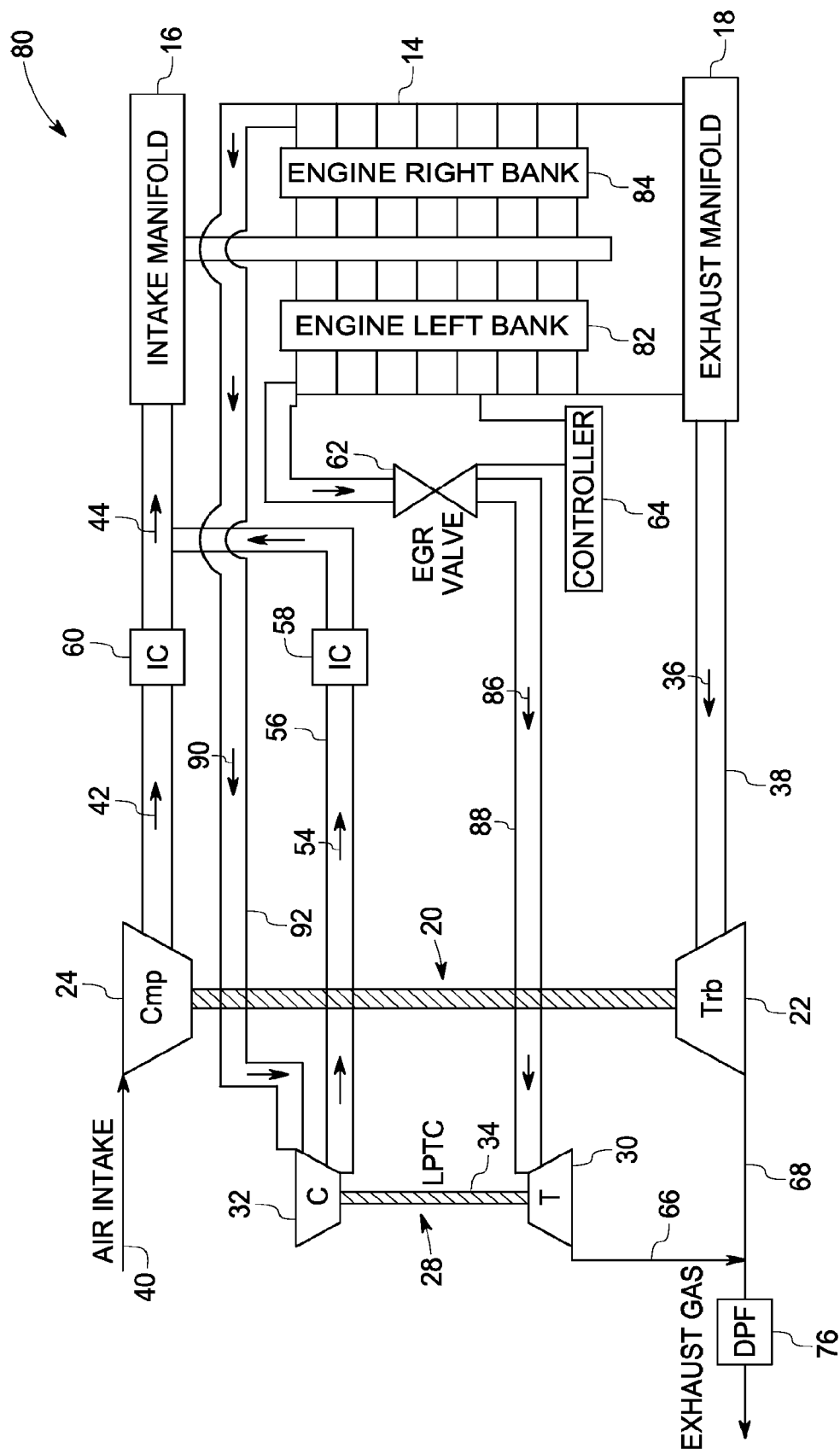
FIG. 3 is a diagrammatical illustration of a turbocharged internal combustion engine system having an exemplary exhaust gas recirculation mechanism coupled to engine left and right banks in accordance with embodiments of the present technique.

FIG. 3 is a diagrammatical illustration of a turbocharged internal combustion engine system 80 having an exemplary exhaust gas recirculation mechanism coupled to engine left and right banks 82 and 84. In the illustrated embodiment, the engine 14 includes a plurality of combustion cylinders (e.g., 2, 3, 4, 5, 6, 7, 8, or more) arranged in the engine left and right banks 82 and 84. Further, a portion 86 of exhaust gases from the engine left bank 82 is routed to the low pressure turbine 30 via a conduit 88 for driving the turbine 30, which in turn drives the low pressure compressor 32. Additionally, a portion 90 of the exhaust gases from the engine right bank 84 is routed to the low pressure compressor 32 via a conduit 92 for compression. The compressed gas 54 from the low pressure compressor 32 is subsequently introduced into the intake manifold 16 of the engine 14. Again, the flow of the exhaust gases 86 from the engine left bank 82 may be controlled via the EGR valve 62 and the controller 64. Further, as described earlier, the high pressure turbine 22 is driven by exhaust gases 36 from the exhaust manifold 18. The high pressure turbine 22 drives the high pressure compressor 24 for compressing the air intake 40 and subsequently introducing the compressed air into the intake manifold 16. It should be noted that the exhaust gases flow through the various turbines and compressors in parallel rather than in series from different portions of the left and right banks 82 and 84.

Figure 4:
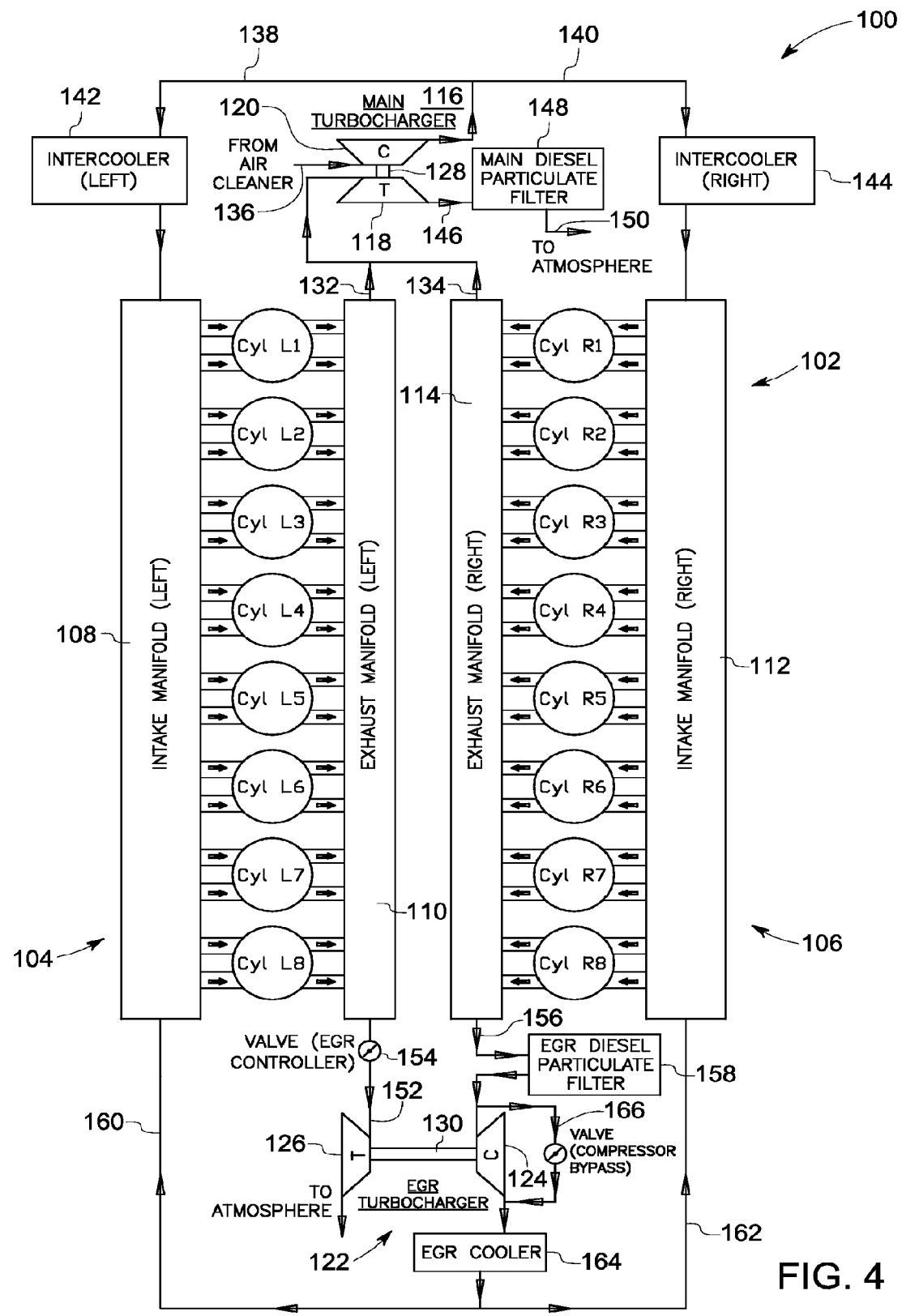
FIG. 4 is a diagrammatical illustration of a turbocharged internal combustion engine system having an exemplary exhaust gas recirculation mechanism for an engine with separate intake and exhaust manifolds for engine left and right banks in accordance with embodiments of the present technique.

FIG. 4 is a diagrammatical illustration of a turbocharged internal combustion engine system 100 having an exemplary exhaust gas recirculation mechanism for an engine 102 with separate intake and exhaust manifolds for engine left and right banks (e.g., left and right series of combustion chambers or piston-cylinder assemblies). In the illustrated embodiment, the engine 102 includes an engine left bank 104 and an engine right bank 106, which include piston-cylinder assemblies labeled as Cyl L1 through Cyl L8 and Cyl R1 through Cyl R8, respectively. Further, the engine left bank 104 includes an intake manifold 108 and an exhaust manifold 110. Similarly, the engine right bank 106 includes an intake manifold 112 and an exhaust manifold 114. The engine system 100 includes a high pressure turbocharger 116 having a variable geometry high pressure turbine 118 and a high pressure compressor 120. Additionally, the system 100 includes a low pressure turbocharger 122 having a low pressure compressor 124 and a variable geometry low pressure turbine 126. In the illustrated embodiment, the low pressure turbocharger 122 is disposed in a generally parallel configuration with the high pressure turbocharger 116. In other words, exhaust gases are provided to these turbochargers 116 and 122 in a simultaneous and independent manner from different outlets from the exhaust manifolds 110 and 114, rather than passing in a sequential or serial manner from one turbocharger to another. Further, the high pressure turbine 118 is drivingly coupled to the high pressure compressor 120 via a shaft 128. Similarly, the low pressure turbine 126 is drivingly coupled to the low pressure compressor 124 via a shaft 130.

In the embodiment illustrated in FIG. 4, exhaust gases from the engine left and right banks 104 and 106 are recirculated within the system 100. In operation, the high pressure turbine 118 is driven by a portion of exhaust gases 132 and 134 from exhaust manifolds 110 and 114 of left and right banks 104 and 106. Further, the high pressure compressor 120 is driven via the high pressure turbine 118 and is configured to compress an intake air 136. The compressed intake air is subsequently directed to the intake manifolds 108 and 112 of left and right banks 104 and 106, as represented by reference numerals 138 and 140. In certain embodiments, intercoolers 142 and 144 may be employed to cool the compressed air 138 and 140 prior to its introduction to the intake manifolds 108 and 112. Further, exhaust gases 146 from the high pressure turbine 118 may be filtered via a particulate filter 148 and are subsequently discharged to the atmosphere, as represented by reference numeral 150.

Moreover, the low pressure turbine 126 is driven by a portion of exhaust gases 152 from the exhaust manifold 110. In this embodiment, an EGR valve 154 is employed to control the flow of the exhaust gases 152. The low pressure compressor 124 is driven by the low pressure turbine 126 and receives a portion 156 of exhaust gases from the exhaust manifold 114 from the engine right bank 106. In certain embodiments, a particulate filter 158 may be disposed upstream of the low pressure compressor 124 for filtering any particulate matter in the gases 156. Further, the compressed gases are directed to the intake manifolds 108 and 112 as represented by reference numeral 160 and 162. In certain embodiments, a cooler 164 may be employed to cool the gases 160 and 162 prior to their introduction to the intake manifolds 108 and 112. Furthermore, a particulate filter (not shown) may be disposed downstream of the low pressure turbocharger 122 for filtering the particulate matter in the exhaust gases from the low pressure turbine 126. In certain other embodiments, a compressor bypass valve 166 may be employed to direct a portion of uncompressed exhaust gases 156 to the intake manifolds 108 and 112. For example, the compressor bypass valve may be operated at lower notch settings for directing a portion of the uncompressed exhaust gases 156 to the intake manifolds 108 and 112.

FIG. 5 is a diagrammatical illustration of a turbocharged internal combustion engine system 170 having an exemplary exhaust gas recirculation mechanism for an engine 172 with engine left and right banks with a common intake manifold. In the illustrated embodiment, the engine 172 includes engine left and right banks 174 and 176 having a plurality of combustion cylinders or piston-cylinder assemblies, such a represented by labels Cyl L1 through Cyl L8 and Cyl R1 through Cyl R8, respectively. Further, the engine 172 includes a common intake manifold 180 and exhaust manifolds 182 and 184 coupled to the left and right engine banks 174 and 176. As illustrated, portions of exhaust gases 132 and 134 from the exhaust manifolds 182 and 184 are utilized to drive the high pressure turbine 118, which in turn drives the high pressure compressor 120 via shaft 128. Further, intake air 136 enters the high pressure compressor 120, and the compressed intake airflows 138 and 140 from the high pressure compressor 120 are directed to the common intake manifold 180 through left and right intercoolers 142 and 144, respectively. Again, the exhaust gases 146 from the high pressure turbine 118 may pass through the particulate filter 148 before exiting to the atmosphere as indicated by arrow 150. Similarly, a portion 152 of exhaust gases from the exhaust manifold 182 of the engine left bank 174 is routed to drive the low pressure turbine 126 and a portion of the exhaust gases from the exhaust manifold 184 of the engine right bank 176 is routed to the low pressure compressor 124 for further compression and introduction into the intake manifold 180. Advantageously, the exhaust gas recirculation in the system 170 as described below facilitates substantial reduction in emissions from the system 170. Again, in the embodiment of FIG. 5, the exhaust gases flow through the various turbines and compressors in parallel rather than in series. In other words, the exhaust gases pass through the various turbines and compressors simultaneously and independently rather than passing through one compressor after another or one turbine after another.

FIG. 6 is a diagrammatical illustration of a turbocharged internal combustion engine system 190 having an exemplary exhaust gas recirculation mechanism for the engine 172 with separate turbochargers coupled to the engine left and right banks. In the illustrated embodiment, the system 190 includes a first high pressure turbocharger 192 and a second high pressure turbocharger 194 coupled to the engine banks 174 and 176. Further, the system 190 includes the low pressure turbocharger 122 coupled in a non-sequential or generally parallel and independent configuration with the first and second high pressure turbochargers 192 and 194. The first high pressure turbocharger 192 includes a variable geometry high pressure turbine 196 and a high pressure compressor 198. Similarly, the second high pressure turbocharger 194 includes a variable geometry high pressure turbine 200 and a high pressure compressor 202. Furthermore, the high pressure compressor 198 is drivingly coupled to the high pressure turbine 196 via a shaft 204. Similarly, the high pressure compressor 202 is drivingly coupled to the high pressure turbine 200 via a shaft 206. In a present embodiment, the system 190 includes the exhaust manifolds 182 and 184 and the common intake manifold 180, as described earlier with reference to FIG. 5.

In operation, the high pressure turbine 196 is driven by a portion of exhaust gases 208 from the exhaust manifold 182 of the engine left bank 174. Similarly, the high pressure turbine 200 is driven by a portion of exhaust gases 210 from the exhaust manifold 184 of the engine right bank 176. Further, the high pressure compressors 198 and 202 are driven by the high pressure turbines 196 and 200, respectively. The high pressure compressors 198 and 202 receive an intake air 212 and are configured to compress the intake air 212 to generate compressed intake airflows 214 and 216 that are subsequently directed to the intake manifold 180. In this embodiment, intercoolers 218 and 220 are disposed downstream of the high pressure compressors 198 and 202 for cooling the compressed intake air 214 and 216 prior to introduction to the intake manifold 180. Furthermore, as described earlier with reference to FIG. 5, the low pressure turbine 126 is driven by the exhaust gases 152 from the exhaust manifold 182. Further, the exhaust gases 156 from the exhaust manifold 184 are directed to the low pressure compressor 124 and are subsequently recirculated to the intake manifold 180.

FIG. 7 is a diagrammatical illustration of another turbocharged internal combustion engine system 220 having an exemplary exhaust gas recirculation mechanism for the engine 172 with a common intercooler for engine left and right banks. The configuration for exhaust gas recirculation for this embodiment is similar to the embodiment illustrated in FIG. 5. As described earlier, the exhaust gases 132 and 134 from the exhaust manifolds 182 and 184 are utilized to drive the high pressure turbine 118 of the high pressure turbocharger 116. Further, the air intake 136 is compressed via the high pressure compressor 120, which is driven by the high pressure turbine 118. In this embodiment, a common intercooler 222 is disposed downstream of the high pressure compressor 120 for cooling compressed air intake 224 from the high pressure compressor 120 and subsequently introducing the compressed air intake 224 to the intake manifold 180, as represented by reference numeral 226.

The exhaust gas recirculation described above with reference to FIGS. 1-7 facilitates substantial reduction in pollutant emissions from a turbocharged engine system. FIG. 8 is a graphical representation 230 of exemplary results for $NO_x$ emissions and the brake specific fuel consumption (BSFC) at different EGR cooler temperatures for the turbocharged internal combustion engines of FIGS. 1-7. In the illustrated embodiment, the abscissa axis 232 represents the exhaust gas recirculation cooler temperature and the ordinate axis 234 represents the % change in $NO_x$ emissions from the turbocharged internal combustion engines of FIGS. 1-7. Further, the ordinate axis 236 represents a % change in BSFC of the turbocharged internal combustion engine system. The $NO_x$ emissions at different EGR cooler temperatures are represented by a profile 238 and the change in the BSFC is represented by an exemplary profile 240. In this embodiment, the different EGR cooler temperatures are indicative of different EGR ratio in the turbocharged internal combustion engine system.

As illustrated, the $NO_x$ emissions 238 from the system reduce as the EGR cooler temperature 232 decreases over a period of time. Thus, as the EGR ratio within the system increases the $NO_x$ emissions 238 from the system are substantially reduced. Further, in this embodiment, as represented by the profile 240, the BSFC of the system does not change substantially at the different EGR cooler temperatures. In the illustrated embodiment, the EGR in the system provides a % $NO_x$ benefit of about 42% without a substantial increase in the BSFC.

The various aspects of the method described hereinabove have utility in different applications such as turbocharged internal combustion engines employed in vehicles, locomotives and so forth. As noted above, the selective exhaust gas recirculation within the system enables reduction of emissions particularly $NO_x$ emissions from such systems thereby facilitating the operation of the engine in an environmentally friendly manner. In addition, the technique described above facilitates substantial reduction in $NO_x$ emissions for different engine operating conditions while achieving a desired specific fuel consumption (SFC) for the engine.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating an engine system, comprising:
routing a first portion of exhaust gases from an internal combustion engine to drive a variable geometry high pressure turbine of a high pressure turbocharger;
routing a second portion of the exhaust gases to drive a variable geometry low pressure turbine of a low pressure turbocharger;
routing a third portion of the exhaust gases to a low pressure compressor of the low pressure turbocharger to compress the third portion of exhaust gases for intake into the internal combustion engine, wherein the first and second portions of exhaust gases are different from one another, wherein the first and second portions of the exhaust gases are introduced simultaneously into the high pressure and low pressure turbines, respectively, wherein the exhaust gases do not pass from one turbine to another turbine of the respective turbochargers, and wherein the third portion includes at least some of the first portion of exhaust gases output from the high pressure turbine; and
controlling operating parameters comprising varying flow of the third portion to change an amount of exhaust gas recirculation to reduce nitrogen oxide (NOx) emissions and to achieve a desired specific fuel consumption (SFC).

2. The method of claim 1, further comprising driving a high pressure compressor of the high pressure turbocharger via the high pressure turbine to provide compressed intake air into the internal combustion engine.

3. The method of claim 2, further comprising cooling the compressed intake air from the high pressure compressor via an air cooler disposed downstream of the high pressure compressor.

4. The method of claim 1, further comprising cooling the exhaust gases from the low pressure compressor prior to intake into the internal combustion engine.

5. The method of claim 1, further comprising controlling flow of the third portion of the exhaust gases to the low pressure compressor via an EGR valve based upon engine operating conditions, or performance of the high pressure turbocharger, or performance of the low pressure turbocharger, or combinations thereof.

6. The method of claim 1, wherein controlling the operational parameters comprises varying a temperature of a cooler to vary temperature of intake delivered into the internal combustion engine.

7. The method of claim 1, wherein controlling the operational parameters comprises reducing the nitrogen oxide (NOx) emissions without a substantial increase in the specific fuel consumption (SFC).

8. The method of claim 7, wherein reducing the nitrogen oxide (NOx) emissions comprises reducing the nitrogen oxide (NOx) emissions by at least up to about 42 percent.

9. The method of claim 1, wherein controlling comprises varying the operational parameters, including the flow of the third portion, in response to an environmental condition including altitude.

10. A method for reducing pollutant emissions in an internal combustion engine, comprising:
coupling a high pressure turbocharger having a high pressure compressor and a variable geometry high pressure turbine to the internal combustion engine;
coupling a low pressure turbocharger having a low pressure compressor and a variable geometry low pressure turbine in a generally parallel flow configuration with the high pressure turbocharger, wherein the generally parallel flow configuration includes a first portion of exhaust gases from the internal combustion engine to the variable geometry high pressure turbine, and a second portion of the exhaust gases from the internal combustion engine to the variable geometry low pressure turbine, wherein the first and second portions of exhaust gases are different from one another, wherein the first and second portions of the exhaust gases are introduced simultaneously into the high pressure and low pressure turbines, respectively and wherein the exhaust gases do not pass from one turbine to another turbine of the respective turbochargers;
routing a third portion of the exhaust gases that include at least some of the first portion of exhaust gases output from the high pressure turbine to the low pressure compressor and subsequently introducing the compressed exhaust gases into an intake manifold of the internal combustion engine; and
providing a control system configured to vary operating parameters to reduce nitrogen oxide (NOx) emissions and to achieve a desired specific fuel consumption (SFC), wherein the operating parameters include a flow of the third portion to the intake manifold to change an amount of exhaust gas recirculation.

11. The method of claim 10, further comprising coupling an EGR valve to control the flow of the third portion of the exhaust gases to the low pressure compressor.

12. The method of claim 10, wherein the control system is responsive to ambient temperature and altitude in a high altitude environment.

13. A system, comprising:
an internal combustion engine having an intake manifold and an exhaust manifold;
a high pressure turbocharger having a variable geometry high pressure turbine drivingly coupled to a high pressure compressor, wherein the variable geometry high pressure turbine is driven by a first portion of exhaust gases from the exhaust manifold, wherein the high pressure compressor is configured to compress an intake air and to provide the compressed intake air to the intake manifold; and
a low pressure turbocharger having a variable geometry low pressure turbine drivingly coupled to a low pressure compressor, wherein the variable geometry low pressure turbine is driven by a second portion of the exhaust gases from the exhaust manifold, wherein the low pressure compressor is configured to compress a third portion of the exhaust gases from the exhaust manifold and to provide the compressed third portion to the intake manifold, wherein the first and second portions of the exhaust gases are different from one another, wherein the first and second portions of the exhaust gases are introduced simultaneously into the high pressure and low pressure turbines, respectively, wherein the exhaust gases do not pass from one turbine to another turbine of the respective turbochargers, and wherein the third portion includes at least some of the first portion of exhaust gases output from the high pressure turbine; and
a flow control configured to vary flow of the third portion to the intake manifold based at least in part on an environmental condition, wherein the environmental condition comprises altitude.

14. The system of claim 13, further comprising a cooler disposed downstream of the low pressure compressor and configured to cool the third portion of exhaust gases prior to introduction into the intake manifold.

15. The system of claim 13, further comprising an air cooler disposed downstream of the high pressure compressor and configured to cool the compressed intake air from the high pressure compressor.

16. The system of claim 13, further comprising an exhaust gas recirculation (EGR) valve configured to control a flow of the third portion of the exhaust gases to the low pressure compressor.

17. The system of claim 16, further comprising a controller configured to control the flow via the EGR valve based upon engine operating conditions, or performance of the low pressure turbocharger, or performance of the high pressure turbocharger, or combinations thereof.

18. The system of claim 13, further comprising a particulate filter configured to filter particulate matter from the exhaust gases prior to introduction of the exhaust gases to the low pressure compressor.

19. The system of claim 13, wherein the system comprises a vehicle, or a locomotive, or a marine application, or an industrial application.

20. The system of claim 13, wherein the third portion is about 12 percent of the exhaust gases.

21. The system of claim 13, wherein the environmental condition comprises an ambient temperature.

22. The system of claim 13, wherein the flow control is configured to vary flow of the third portion to the intake manifold based at least in part on a temperature of an intake cooler coupled to the intake manifold, a turbine nozzle ring area, and a turbine flow rate.

23. The system of claim 13, comprising a control system configured to vary operating parameters to reduce nitrogen oxide (NOx) emissions and to achieve a desired specific fuel consumption (SFC), wherein the control system comprises the flow control.

24. The system of claim 13, comprising another high pressure turbocharger having another variable geometry high pressure turbine drivingly coupled to another high pressure compressor, wherein the other variable geometry high pressure turbine is driven by a fourth portion of exhaust gases from the exhaust manifold, wherein the other high pressure compressor is configured to compress the intake air and to provide the compressed intake air to the intake manifold.

25. A system, comprising:
an internal combustion engine having an intake manifold and an exhaust manifold;
a first turbocharger having a first turbine drivingly coupled to a first compressor, wherein the first turbine is driven by a first portion of exhaust gases from the exhaust manifold, wherein the first compressor comprises a first output coupled to the intake manifold and configured to compress an intake air and to provide the compressed intake air to the intake manifold;
a second turbocharger having a second turbine drivingly coupled to a second compressor, wherein the second turbine is driven by a second portion of the exhaust gases from the exhaust manifold, wherein the second compressor comprises a second output coupled to the intake manifold and is configured to compress a third portion of the exhaust gases from the exhaust manifold and to provide the compressed third portion to the intake manifold, wherein the first and second portions of the exhaust gases are different from one another, wherein the exhaust gases do not pass from one turbine to another turbine of the respective turbochargers, and wherein the third portion includes at least some of the first portion of exhaust gases output from the high pressure turbine;
a motor configured to drive the first turbocharger at selected operating conditions of the internal combustion engine; and
a control system configured to vary operating parameters to reduce nitrogen oxide (NOx) emissions and to achieve a desired specific fuel consumption (SFC), wherein the operating parameters include a flow of the third portion to the intake manifold to change an amount of exhaust gas recirculation.

26. The system of claim 25, wherein the first and second portions of the exhaust gases are introduced simultaneously into the first and second turbines, respectively.

27. The system of claim 25, wherein the control system is responsive to an environmental condition including altitude.

* * * * *